Figure 1:
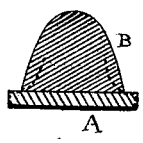

No. 642,513. Patented Jan. 30, 1900.
F. H. BOLTE.
RUBBER TIRE FOR VEHICLE WHEELS.
(Application filed Oct. 29, 1898. Renewed Jan. 5, 1900.)
(No Model.)

WITNESSES—
J. H. Busch
Charles J. Wolfe

INVENTOR
Frank H. Bolte
By L. M. Thurlow
ATTY.

THE NORRIS PETERS CO., PHOTO-LITHO., WASHINGTON, D. C.

UNITED STATES PATENT OFFICE.

FRANK H. BOLTE, OF PEORIA, ILLINOIS, ASSIGNOR TO THE PEORIA RUBBER AND MANUFACTURING COMPANY, OF SAME PLACE.

RUBBER TIRE FOR VEHICLE-WHEELS.

SPECIFICATION forming part of Letters Patent No. 642,513, dated January 30, 1900.

Application filed October 29, 1898. Renewed January 5, 1900. Serial No. 513. (No model.)

*To all whom it may concern:*

Be it known that I, FRANK H. BOLTE, a citizen of the United States, residing at Peoria, in the county of Peoria and State of Illinois, have invented certain new and useful Improvements in Rubber Tires for Vehicle-Wheels; and I do hereby declare that the following is a full, clear, and exact description of the invention, which will enable others skilled in the art to which it appertains to make and use the same.

This invention relates to improvements in rubber-tire construction, and more particularly to solid or cushion tires.

The object of the invention is to incorporate in a tire means for preventing the separation of its several parts, and especially tires in which these several parts are rubber of varying densities.

Furthermore, the object is to stiffen the portions, so that they are not easily unseated from the rim of the wheel.

My invention deals particularly with a tire composed of the usual tread portion secured to a flexible base, the latter incapable of stretching in any direction. If the tire is vulcanized while every portion of its length is set to a smaller curve than the wheel to receive it, with the base forming the inside of such curve, when opened and spread upon the wheel the tread will be compressed and cannot be cut, and therefore cannot spread or gap, as in old-time construction. It is my object therefore to combine my invention with this kind of tire in addition to the objects before stated. The compression above referred to is a result of opening the tire against its unyielding base to a longer curve than that occupied by it when vulcanized. I am aware, however, that tires of this nature are not new, also that fabric has been employed in tires; but these have been claimed in separate patents and are not combined as I show them and do not accomplish the same objects as do mine. Furthermore, the fabric has not been used for the purpose of binding together sections of rubber of different densities. This latter object I regard as of primary importance.

When sections of rubber differ in the manner described and are vulcanized and put under pressure or strain, they are very apt to separate at their junctures because the molecules of rubber cannot thoroughly cohere in the vulcanizing process owing, as before stated, to the differences in their compositions. It is common practice to combine a hard-rubber base and a soft-rubber tread to form a tire for use on vehicle-wheels, but after a time the tread and base become separated because of the lack of a proper uniting medium other than the vulcanized particles of the rubber.

My improvements may be understood by referring to the accompanying drawings, in which—

Figure 2:
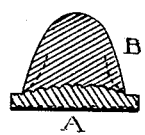
Figure 3:
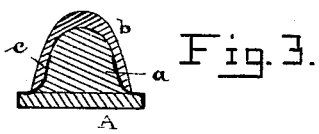
Figure 4:
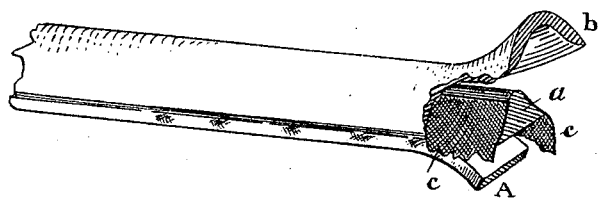
Figure 5:
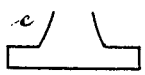
Figure 5A:
Figure 6:
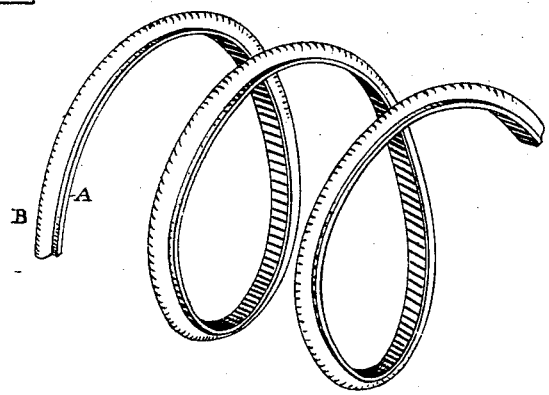
Figure 7:
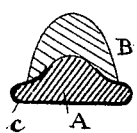
Figures 8, 9:
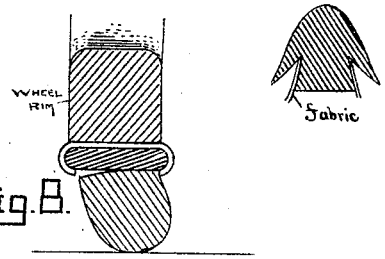

Figure 1 shows a cross-section of my improved tire. Fig. 2 is a modified form of the same. Fig. 3 shows a way of making the tire by my improved method. Fig. 4 is a perspective view of a section of the tire with parts separated to better show construction. Fig. 5 is a section of the fabric as used in the tire. Fig. 5$^a$ is a section of the fabric used in the tire, but of a slightly-modified form. Fig. 6 is a portion of the finished tire, showing its spiral form. Fig. 7 is a cross-section of a reinforced base, forming, together with the fabric, a very efficient tire. Fig. 8 is a cross-section of the rim of a wheel, showing the side strain or pressure imposed upon the tire and the result of such pressure when using the old forms of tire. Fig. 9 shows another method of forming my improved tire by cutting the sides and inserting the binding fabric.

In the figures, A is the base, of hard rubber, and B the soft-rubber tread. Usually these have been vulcanized together without any fastening other than the cohesive properties of the vulcanized rubber, as before stated. These portions are consequently separable under strain, as is shown in Fig. 8. To overcome this objection, I provide at each side of the tire a strip of fabric for binding the parts strongly together. The mode of constructing the tire is better shown in Figs. 3 and 4, in which the tread portion is composed of the parts $a$ and $b$. The section $a$ is first placed upon the base A. Then the strips $c$ of fabric are cemented to said portion $a$, as shown, and the edges thereof are brought down and cemented to the edges of the base. A strip $b$ of rubber, forming a cap, is next placed over the portion $a$ and the fabric and the edges brought down to the base, as indicated. In Fig. 5$^a$ the fabric portions are shown separately, so as to give a clearer idea of their shape and position when in the tire. Fig. 5 is a cross-section of a form of the fabric in which a broad sheet of the material is employed passing entirely around under the base from side to side, as indicated in Fig. 2 in dotted lines. In this same figure the base and tread are corrugated where they join. This is done in order to obtain a larger surface of contact. It is possible to hold the tread and base together by the fabric only and omit the vulcanizing of the said tread and base for joining purposes. It is evident that other means of securing the fabric to the tire portions may be used—as, for instance, in Fig. 9 the tread is cut longitudinally and the fabric let in cemented and then vulcanized, answering thereby the same as in the first method described. The fabric not only prevents the several elements of the tire from being separated, but makes the base portion rigid, so as to prevent its being drawn from the rim. This is especially true when the fabric extends entirely around the base, as indicated in Figs. 2 and 7. In the latter figure I show the base A enlarged at its middle, said enlargement extending into the tread portion. The advantages in this form are cheapness of construction, a larger vulcanizing-surface, and above all no chance for the base portion being withdrawn from its seat or its buckling in the rim, and as I am not aware of this particular improvement in tires I desire to embody it as my own in this application. I may vulcanize the fabric to the outside of the tread instead of letting it in and may let it into the base portion. Any of such methods or those shown and described will fulfil my intention.

After the tire has been provided with its fabric it is coiled in spiral form, so as to have each of its convolutions of a shorter circumference than the periphery of the wheel it is intended for and is then vulcanized.

I am aware that several patents show a tire secured to the rim of the wheel by means of fabric, and still others show a fabric for strengthening and stiffening the tread portion, but none of them show the fabric affixed as I show it, nor do they accomplish the same purposes as mine. Therefore I believe it is new to provide a combination of the fabric, the non-extensible base, and soft tread as I show them and to provide tires with fabric for the purposes set forth and to reinforce the base portion as shown, for the purposes described.

Having thus described my invention, what I claim as new, and desire to secure by Letters Patent, is—

1. For a rubber vehicle-tire, a flexible, non-extensible base portion, a soft-rubber tread therefor and fabric held within such tread, extending therefrom and secured to such non-extensible base portion for preventing separation of the parts as set forth.

2. For a rubber vehicle-tire, a flexible non-extensible portion, a soft-rubber tread secured thereto, and fabric vulcanized within the tread and extending therefrom and attached to said base portion for preventing the separation of such base and tread as described.

3. A rubber tire, having a flexible non-extensible base and a soft-tread portion secured thereto, fabric held within the body of said tread portion and extending therefrom and attached to the base for preventing the separation of those parts as set forth.

4. In a rubber tire for vehicle-wheels, a hard-rubber base portion adapted to be secured to a wheel, a soft-rubber tread vulcanized to such base, fabric vulcanized within the tread near the sides thereof, projecting therefrom and vulcanized to said base portion in such manner as to prevent the separation of the said base and tread as set forth.

5. For a rubber tire, a flexible non-extensible base portion, a soft-rubber tread therefor and fabric attached to the tread and base portion for holding such portions securely against separation as set forth.

6. In a rubber tire for vehicle-wheels, a flexible non-extensible base having reinforced rib extending its entire length for preventing buckling of the tire or its withdrawal from the wheel-rim, a soft-rubber tread secured to such base, and fabric vulcanized to the base and tread for the purposes set forth.

7. In a rubber tire, a flexible non-extensible base portion having a reinforcing-rib at its middle, forming part thereof and extending its entire length for preventing lateral bending or buckling of such tire or its withdrawal from the wheel-rim, a soft-rubber tread vulcanized to the base and having the said rib extending into it and fabric extending around such base the edges extending into the interior of the tire thus constructed and vulcanized between the said base and tread portion, as set forth.

8. In a rubber tire a flexible non-extensible base portion having a tread portion vulcanized thereto, the surfaces of such base and tread portions where they join each other provided with corrugations to give stronger adhering surfaces, fabric surrounding the base transversely and vulcanized thereto; the edges thereof extending into the tire and vulcanized therein substantially as set forth and for the purposes described.

9. For a rubber vehicle-tire a flexible non-extensible base portion, a soft-rubber tread vulcanized thereto and fabric vulcanized to the base, the edges thereof entering the tread portion and vulcanized therein substantially as set forth and for the purposes described.

In testimony whereof I affix my signature in presence of two witnesses.

FRANK H. BOLTE.

Witnesses:
A. G. SIEBERLING,
MONROE SIEBERLING.